Nov. 10, 1953 E. FEINE 2,658,388
ORTHOPEDIC BALANCING APPARATUS FOR LEG AMPUTEES
Filed Oct. 23, 1950 3 Sheets-Sheet 3
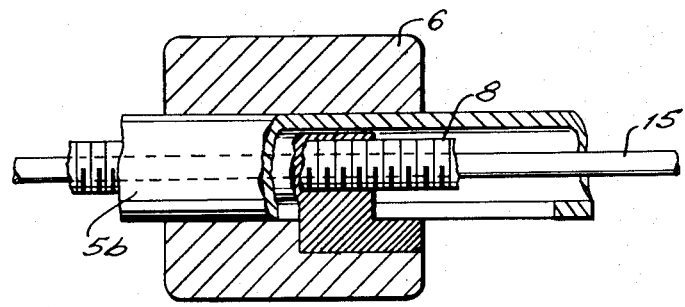
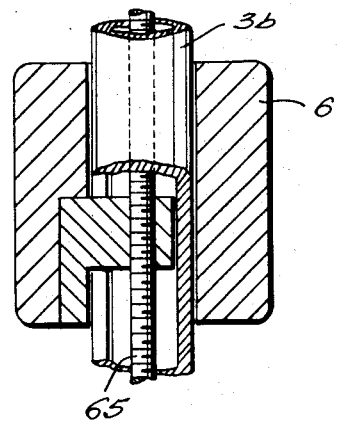
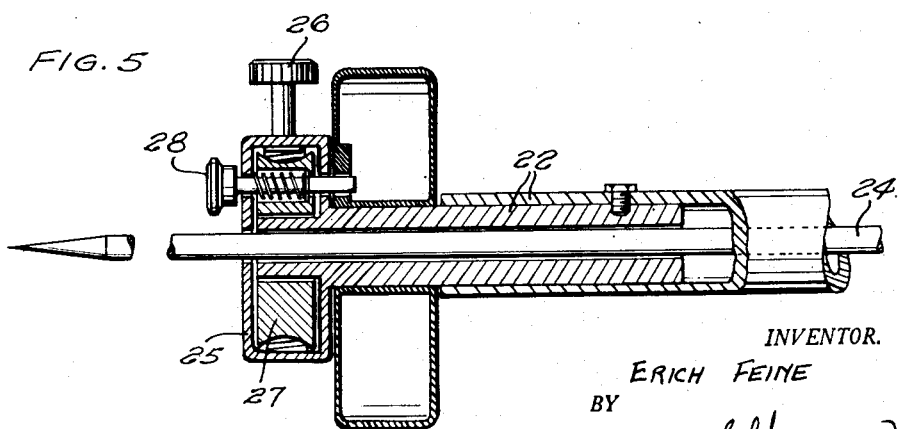
INVENTOR.
ERICH FEINE Patented Nov. 10, 1953

2,658,388

UNITED STATES PATENT OFFICE 2,658,388

ORTHOPEDIC BALANCING APPARATUS FOR LEG AMPUTEES

Erich Feine, Ravensburg, Germany

Application October 23, 1950, Serial No. 191,623

Claims priority, application Germany October 24, 1949

13 Claims. (Cl. 73—172)

The present invention relates to a balancing apparatus and more particularly to an orthopedic balancing apparatus for leg-amputees. It is an object of the present invention to determine the median line of an amputee at a one-legged attitude on the brim of the socket for the purpose of manufacturing an artificial leg.

It is another object of the present invention to fix the position of the socket and the course of the median line of the amputee when marking the frontal plane and the sagittal plane on the socket.

It is a further object of the present invention to determine the position of the hip joint of the amputee relatively to a predetermined position in the balancing apparatus.

A balancing apparatus according to the present invention comprises in combination, means for forcing a planned one-legged attitude of the amputee on the brim of the socket; and means for bringing the median line of the amputee into coincidence with the line of gravity of the balancing apparatus.

Preferably water levels forming part of the balancing apparatus are arranged so as to check the position of the line of gravity of the balancing apparatus.

A preferred embodiment of the present invention comprises, in addition thereto a frame, a universal joint, preferably a half joint, arranged in the frame above the levels of the centers of gravity of the amputee and the balancing apparatus, a device for supporting the socket and the amputee, the device being suspended from the frame by the universal joint so as to be movable in three planes, means for forcing a planned one-legged attitude of the amputee on the brim of the socket, and means for bringing the median line of the amputee into coincidence with the line of gravity of the balancing apparatus.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 3, 4 and 5 are, respectively, enlarged sectional views of the device shown in Fig. 1 taken, respectively, along the lines A—B, C—D and E—F.

It should be understood that the term "median line" wherever it occurs hereinafter or in the following claims, means the vertical line through the center of gravity of the amputee.

Figure 1:
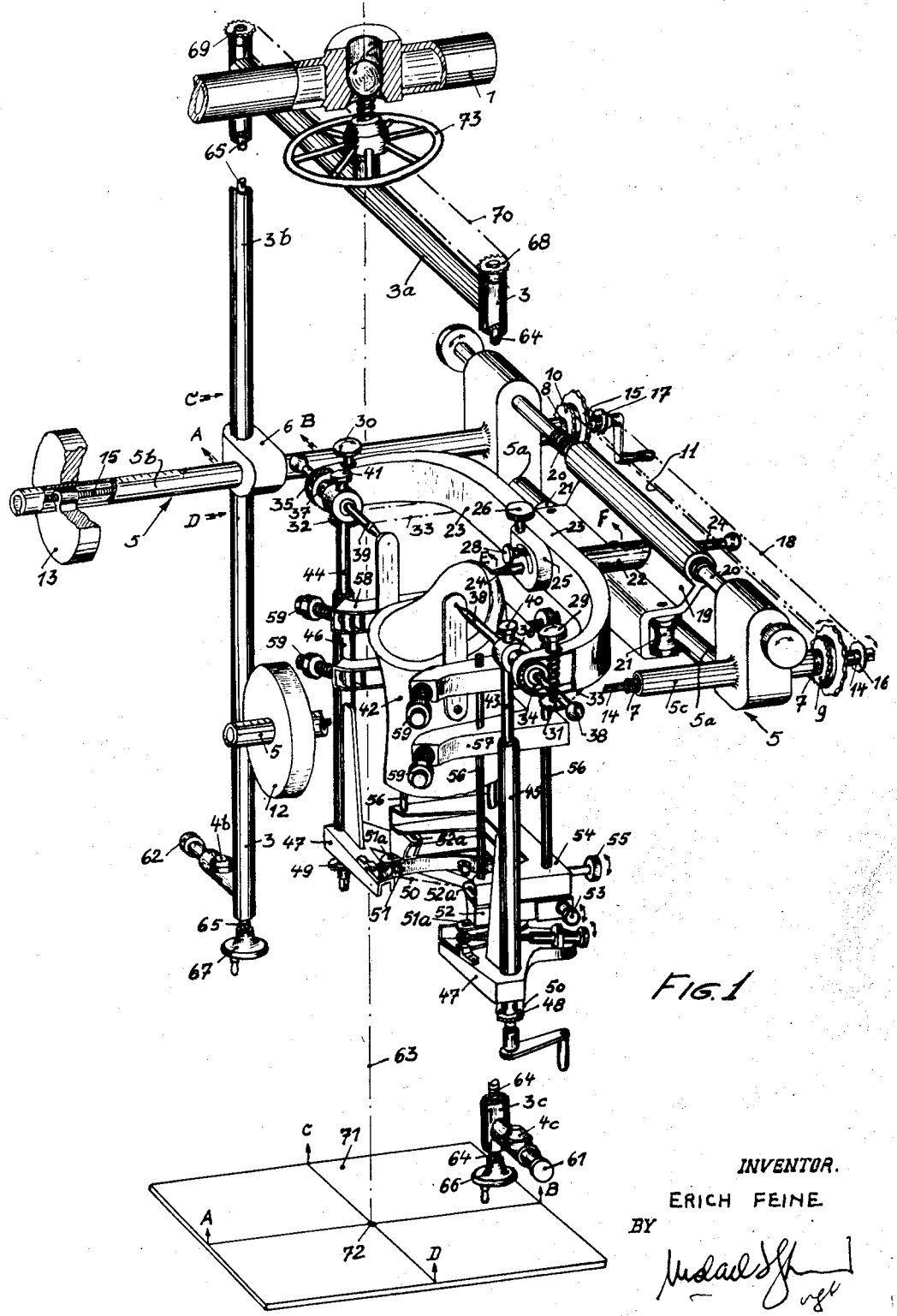
Fig. 1 is a perspective view of an orthopedic balancing apparatus according to the invention, some parts being broken away for the sake of clearness.

Referring now to the drawings, 1 is part of a carrying frame from which a symmetrical rectangular vertical frame 3 is suspended by means of a universal joint such as a ball 2. The frame 3 comprises a horizontal leg 3a and two vertical legs 3b, 3c, respectively. The upper portion of the vertical leg 3b and the mid-portion of the vertical leg 3c are broken away in Fig. 1 in order not to obscure some parts of the drawing. The vertical legs 3b, 3c of the frame 3 are provided with circular water levels 4b, 4c arranged at the lower ends of the vertical legs 3b, 3c, respectively. A horizontal frame 5 is carried by the vertical frame 3 by means of brackets such as 6 permitting a displacement of the horizontal frame 5 horizontally and vertically with respect to the vertical frame 3 (see also Figs. 3 and 4). The frame 5 comprises a sagittal leg 5a and two frontal legs 5b and 5c. The brackets are provided on the vertical legs 3b, 3c of the vertical frame 3 and the frontal legs 5b, 5c of the horizontal frame 5, only one bracket 6 being shown in the drawing, the other being arranged on the mid-portions of the front leg 3c of the vertical frame 3 and the frontal leg 5c of the horizontal frame 5 which are not shown in the drawing in order not to obscure the parts behind the same.

The horizontal displacement of the horizontal frame 5 is carried out by means of threaded spindles 7 and 8 (termed hereinafter the third threaded spindles) which are arranged within the two frontal legs 5c, 5b of the horizontal frame 5, respectively, and carry on the projecting ends thereof chain wheels 9 and 10, respectively. The chain wheels 9 and 10 are connected with each other by a chain 11 which secures a uniform displacement of the horizontal frame 5 if one of the spindles 7 or 8 is driven. The two frontal legs 5b, 5c of the horizontal frame 5 are prolonged at the side opposite to the chain wheels 9 and 10 and carry shiftable weights 12 and 13, respectively, and a graduation, for instance in millimeters. Within the threaded spindles 7 and 8 are arranged threaded spindles 14 and 15, respectively (termed hereinafter the fourth threaded spindles), which permit by means of the chain wheels 15 and 16 and the chain 18 a uniform shifting of the weights 12 and 13.

A sliding bridge 19 is supported by the sagittal leg 5a of the horizontal frame 5 and can be shifted in sagittal direction by means of a threaded spindle 20 (termed hereinafter the first threaded spindle). The sliding bridge 19 moves by means of rollers 21 on the sagittal leg 5a of the horizontal frame 5. The sliding bridge 19 carries a pivot 22 having a frontally directed pivotal axis for pivoting a stirrup 23 to the sliding bridge 19. The pivot 22 is provided with an axial boring for accommodating a pin 24 having a pointed end protruding from the pivot 22 the purpose of which will be more fully described hereinafter. Furthermore, the pivot 22 is rigidly connected to a worm casing 25 connected to a first driving worm 26. If the driving worm 26 is operated, a worm gear 27 is rotated with respect to the pivot 22. A detent pin 28 is resiliently supported by the worm gear 27 and when it is guided by a corresponding boring shown in Fig. 5 of the stirrup 23, the stirrup 23 can be rotated about the pivot 22 only by means of the driving worm 26.

The stirrup 23 carries driving worms 29 and 30 (termed hereinafter the second and third driving worms), respectively, at the outer ends thereof. In order to actuate simultaneously the two driving worms 29 and 30 the latter are prolonged downwards and carry at the lower ends thereof chain wheels 31 and 32, respectively, which are actuated by means of a chain 33 which runs over guiding rollers (not shown) provided below the stirrup 23.

The driving worms 29 and 30 cooperate with worm gears 34 and 35, respectively, which are rigidly connected to pivots 36 and 37, respectively, by which adjusting and clamping devices are supported in the manner to be described more in detail hereinafter. The pivots 36 and 37 have sagitally directed pivotal axes and are provided with axial borings for accommodating the pointed pins 38 and 39, respectively. By means of detent pins 40 and 41, respectively, the adjusting and clamping devices can be secured in position with respect to the pivots 36 and 37. A turning of the adjusting and clamping devices can be effected only by means of the driving worms 29 and 30. If the detent pins 28, 40 and 41 are in operating position a clamped socket 42 can only be moved by means of the driving worms 29 and 30 in a direction corresponding to an abduction and adduction and by means of the driving worm 26 in a direction corresponding to a flexion and extension.

The adjusting and clamping devices will now be described more in detail. The devices comprise two threaded spindles 43 and 44 (termed hereinafter the fifth threaded spindles) which are turnably supported by means of the pivots 36 and 37, respectively. The threaded spindles 43 and 44 extend through tubular sleeves 45 and 46, respectively, which are rigidly connected to a support 47. At their lower ends the threaded spindles 43 and 44 carry chain wheels 48 and 49, respectively, said chain wheels being provided with an internal thread. The support 47 rests on the chain wheels 48 and 49 which are connected with each other by means of a chain 50 which is guided by suitable means (not shown) underneath the support 47. If the chain 50 is driven the support 47 is moved upward or downward in order to carry out an adjustment by which the hip joint of the amputee is adjusted in the level of the plane in which the pivotal axes of the two pivots 36 and 37 and the pivotal axis of the pivot 22 are situated, the socket or bracket 42 being clamped and loaded by part of the weight of the amputee.

A semi-circular adjusting frame 51 is supported by the support 47 for rotation with respect to the support 47 along the circumference of frame 51 through predetermined amounts in both ways, the adjusting frame 51 being guided by rollers (not shown). This axial rotation enables the amputee with clamped and loaded socket 42 to move the socket 42 by means of his stump in a sense of an inward or outward rotation of the leg from the hip joint.

The adjusting frame 51 is provided with a guiding slot 51a which enables a first rectangular adjusting frame 52 which is led in the guiding slot to be adjusted in frontal direction by means of a threaded spindle 53 (termed hereinafter the sixth threaded spindle). Thus it is accomplished that the hip joint of the amputee can be adjusted to the sagittal turning axes of the pivots 36 and 37. The first rectangular adjusting frame 52 is furthermore provided with a guiding slot 52a in which a second adjusting frame 54 is guided which is arranged above the first adjusting frame 52. The frame 54 can be adjusted in sagittal direction by means of a threaded spindle 55 (termed hereinafter the seventh threaded spindle). By adjustment of the adjusting frame 54 the hip joint of the amputee is adjusted to the frontal turning axis of the pivot 22.

Figure 2:
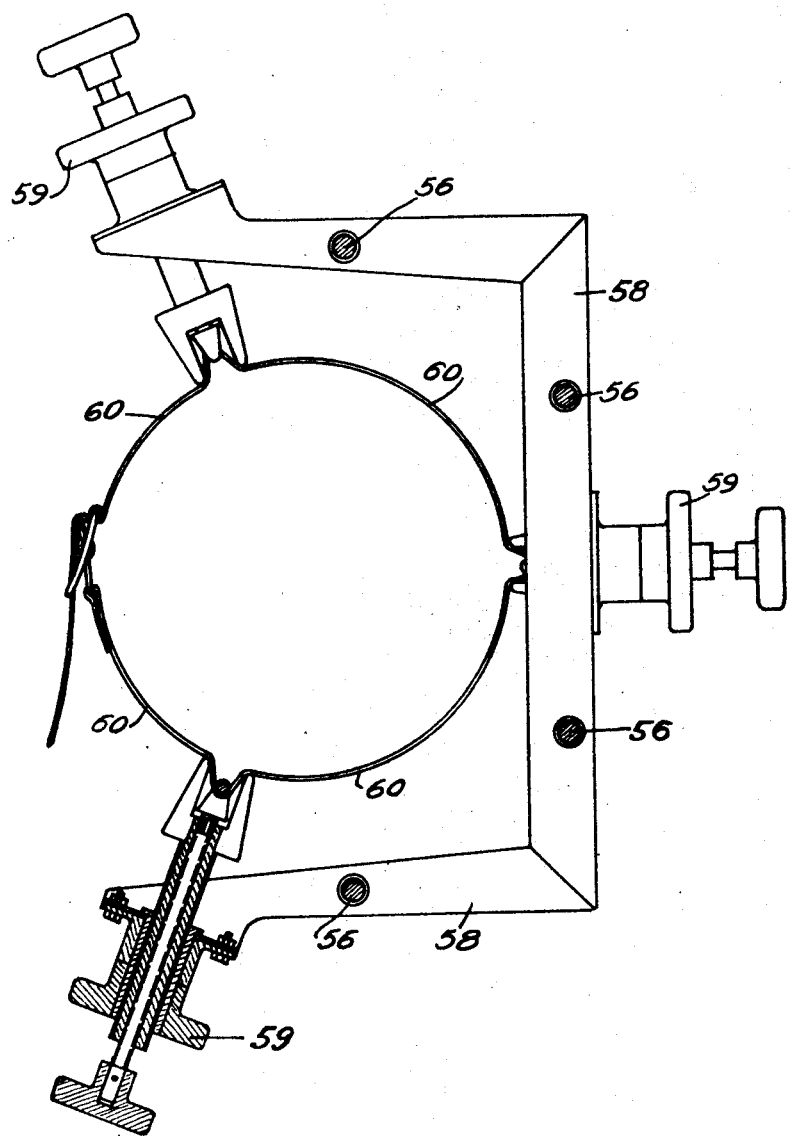
Fig. 2 is a horizontal section on an enlarged scale through a detail of Fig. 1.

The clamping device proper comprises rods 56 which are rigidly connected to the adjusting frame 54 and carries clamping frames 57 and 58 for clamping the socket 42. The clamping frames 57 and 58 carry clamping elements 59 and clamping belts 60 (Fig. 2) by which the socket 42 is fixed in position. If the hip joint of the amputee is correctly adjusted and the pins 28, 40, and 41 are withdrawn from the grooves thereof the amputee can move his stump similarly to the movements made in walking, thereby loading the socket 42.

In order to balance the weight in the sagittal plane telescoping weights 61 and 62 are arranged at the lower free ends of the vertical legs 3c, 3b of the vertical frame 3, respectively. The water levels 4b, 4c serve for checking whether the balancing apparatus is in horizontal equilibrium. If with the socket 42 loaded by the amputee the water levels 4b, 4c, show a deviation the center of gravity of the amputee is adjusted with respect to the balancing apparatus until the water levels indicate the correct equilibrium, the adjustment being done by means of the threaded spindles 7, 8 and 20, the weights 12 and 13 and the telescoping weights 61 and 62. If the amputee is correctly adjusted the water levels give the same indication with the loaded and the unloaded balancing apparatus. The median of the amputee coincides in this case with the line of gravity 63 of the balancing apparatus suspended by means of the ball 2 or a universal joint. Since furthermore all the pivots of the balancing apparatus can be fixed by means of suitable devices a frontal plane A—B and a sagittal plane C—D intersecting each other in the line of gravity 63 can be marked on the socket 42. In order to compensate for any differences in the size of the body of the amputee the horizontal frame 5 together with the adjusting device 43 to 55 and the clamping device 56 to 60 can be shifted upward or downward along the vertical frame 3. In order to accomplish this threaded spindles 64 and 65 (termed hereinafter the second threaded spindles) are arranged within the vertical legs 3c, 3b, respectively, of the vertical frame 3 and carry at their lower ends hand wheels 66 and 67 and at their upper ends chain wheels 68 and 69, respectively. The chain wheels 68 and 69 are connected with each other by a chain 70. In order to mark the frontal plane A—B and the sagittal plane C—D and thus the course of the median of an amputee on the socket 42 the base lines of the frontal plane A—B and the sagittal plane C—D and the vertical projection 72 of the line of gravity 63 of the balancing apparatus are marked on a bottom board 71.

With the above described balancing apparatus the objective determination of the median of an amputated person is carried out at a planned one-legged attitude on the rim of the socket 42. Furthermore the fixation of the resulting position of the socket 42 and the course of the median of the amputee is carried out by marking the frontal plane A—B and the sagittal plane C—D on the socket 42. Furthermore the position of the hip joint of an amputee is ascertained by means of the adjusting device. On the socket the marking of the frontal and sagittal axes of the hip joint is carried out in order to adjust planned proportions between the physiological hip joint of the amputee and the mechanical knee- and ankle joint axis of the prothesis. The proportion between the position of the hip joint and the course of the median of the amputee is ascertained by means of the balancing apparatus and marked by markings on the socket 42. The perception of the suporting pressure of an amputee during a step-like motion and loading of the socket 42 are checked. By means of the above-described balancing apparatus a planned arrangement of the axis of the knee and ankle, of the foot, the ankle, the calf and the knee is accomplished with respect to the fixed median and to the marked planes A—B and C—D. Furthermore by means of the balancing apparatus the one-legged planned attitude of an amputee on the brim of the socket 42 and the course of his median as it is affected by the artificial leg are controlled and checked. By means of the balancing apparatus used as a checking device also checking operations with artificial legs built according to different methods can be carried out such as the checking of the attitude on the brim of the socket and the course of the median of the amputee.

The operation of the balancing apparatus described hereinabove is as follows:

If the balancing apparatus is not loaded the water levels 4b and 4c stand at zero and thus indicate the effectiveness of the same. If now a prefabricated socket 42 or a bucket consisting of a thermoplastic material or the like is clamped by means of the clamping device 56 to 60, the water levels 4b and 4c indicate a deviation from the zero position because the weight of the socket 42 and the weight of the parts of the balancing apparatus suspended from the ball 2 have changed the center of gravity thereof. Of course the clamping device for the ball 2 has to be released so that the new center of gravity can adjust itself in the vertical line through the ball 2. By means of the shiftable weights 12 and 13 a frontal deviation of the water levels 4b and 4c is compensated whereas a sagittal deviation of the water levels is compensated by means of the telescoping weights 61 and 62.

When the water levels are once more in their zero position two balance tests are carried out in order to ascertain the changes of equilibrium caused by the socket 42.

In the first of these tests the horizontal frame 5 is transported to the right or the left with respect to the brackets 6 for instance through 10 mm. by means of the threaded spindles 7 and 8, the chain wheels 9 and 10, and the chain 11. The amount of this shifting is read on a millimeter graduation (not shown) which is provided on the frontal legs 5b and 5c of the horizontal frame 5.

Owing to this shifting movement the water levels 4b and 4c indicate a deviation from the zero position which is restored by a shifting of the weights 12 and 13 about a certain amount, for instance 20 mm.

The second test is carried out in sagittal direction by actuating the threaded spindle 20 and the weights 61 and 62. The distance traversed in this test by the sliding bridge 19 is read on a millimeter graduation (not shown) on the sagittal leg 5a of the horizontal frame 5.

If now at a later time during the adjustment of the median of the amputee into coincidence with the line of gravity 63 of the balancing apparatus a horizontal-frontal shifting of the amputee and thus of the horizontal frame 5 is required, for instance through 10 mm., it is known that in order to obtain equilibrium conditions of the balancing apparatus proper including the weight of the socket 42, a shifting of the weights 12 and 13 through 20 mm. or in the ratio of 1:2 is required. In the same manner horizontal-sagittal shifting operations are carried out.

After this preparation the amputee is placed in the balancing apparatus, his amputation stump being supported by the socket 42. By actuation of the threaded spindles 64 and 65 by means of the hand wheels 66 and 67, the chain wheels 68 and 69, and the chain 70 the correct height of the socket 42 is adjusted. The amputee is standing now in the balancing apparatus as if he were standing on two legs. It should be understood that the detent pins 28, 40 and 41 are in inoperative position during this operation. In consequence thereof the amputee can move by means of his stump the socket 42 together with the stirrup 23 movable about the pivot 22, the adjusting device 43 to 55 and the clamping device 56 to 60 being turnably supported by the pivots 36 and 37, this movement taking place in two planes. If the frontally aligned amputee standing in the balancing apparatus feels that his stump has to be moved in a sense of an inversion or an eversion in order to assume a natural position, an axial rotation of the adjusting frame 51 with respect to the support 47 is effected by means of a threaded spindle (not shown). If now the pointed pins 24, 38 and 39 provided in the axial borings of the pivots 22, 36 and 37, respectively, are pressed against the moving socket 42, certain curves are traced on the latter which show that the axes of the pivots 22, 36 and 37 do not coincide with the physiological axes of rotation of the hip joint of the amputated side of the amputee. In order to achieve the necessary coincidence the detent pins 40 and 41 are brought into operative position so that the socket 42 can only be moved in connection with the stirrup 23 about the frontal pivot 22. By means of the threaded spindles 43 and 44, the chain wheels 48 and 49, and the chain 50, the socket 42 and the hip joint of the amputated side are vertically adjusted to the correct height. By means of the threaded spindle 55 they are adjusted to the frontal axis of the pivot 22. If the adjustment is correct the point of the adjusting pin 24 can be pushed into the socket 42 so that the latter can be moved about the thus formed axis. This shows a coincidence of the physiological turning axis of the hip joint with the pivotal axis of the pivot 22, at the same time a marking being effected on the socket 42. Now the detent pins 40 and 41 are brought into inoperative position whereas the detent pin 28 is brought into operative position. By means of the threaded spindle 53 a coincidence with the sagittal turning axis is obtained and a corresponding marking made on the frontal side of the socket 42. In order to check the perceptions of the supporting pressure of the amputee the detent pins 28, 40 and 41 are then brought into inoperative position so that the amputee can carry out steplike movements during which the greater part of the load of his body is resting on the brim of the socket 42. If local pressure preceptions are felt, the same are remedied by changing the shape of the brim of the socket until a uniform preception of supporting pressure is achieved.

Subsequently a planned one-legged attitude of the amputee on the brim of the socket 42 is determined. In order to accomplish this the ball 2 is fixed in position by means of the hand wheel 73. The detent pins 28, 40, and 41 are brought into operative position. Then the amputee withdraws his healthy leg from the floor and is supported only by the brim of the socket 42 as in taking a step. As a planned attitude corresponding to the attitude of a healthy man during this phase of the step is assumed a raising of the pelvis on the unsupported side and a bending of the spine convexly to the supporting leg, i. e. the artificial leg. As the attitude of the upper part of the trunk of the amputee is determined by the position of the socket 42 and the socket brim as supporting elements for the center of gravity of the amputee during one-legged standing, the position of the socket 42 and the brim of the same is changed by means of the driving worms 26, 29 and 30 so that the planned attitude is brought about by force. It should be noted that the socket 42 and the brim thereof must form suitable supporting elements obtained by a method which does not form part of this invention.

Then the objective determination of the median of the amputee is carried out. In order to do that at first the fixing of the ball 2 is released by means of the hand wheel 73. The heel of the healthy leg of the amputee is brought to the base line of the sagittal plane C—D, the amputee distributing the weight of his body as uniformly as possible to his healthy leg and to the socket 42. In this two-legged attitude the water levels 4b and 4c are adjusted to zero position and thus the equilibrium conditions inside the balancing apparatus including the socket 42 are achieved, the weights 12 and 13, 61 and 62 being correspondingly shifted, if necessary. Now the sagittal plane C—D divides the body of the amputee into a right half and a left half, and coincides with the median plane. Since the water levels 4b and 4c are in zero position the vertical frame 3 is aligned exactly in the direction nose-umbilicus-base line C—D. Consequently the center of gravity of the upper part of the trunk of the amputee is situated in the median plane. On the horizontal frame 5 the position with respect to the bracket 6 is read on the millimeter graduation. Then the amputee withdraws his healthy leg from the floor. Since the detent pins 28, 40 and 41 are in operative position and the driving worms 26, 29 and 30 are not actuated, the amputee can and must retake at once the planned one-legged attitude on the brim of the socket. The water levels 4b and 4c indicate again a deviation since the positions of the weights have been changed. Now the amputee is frontally and sagittally transported by means of the threaded spindles 7 and 8, the chain wheels 9 and 10 and the chain 11 and the threaded spindle 20 until the water levels are once more adjusted to zero. By shifting the weights 12 and 13, 61 and 62 the equilibrium within the balancing apparatus is restored. Now the amputee leaves the balancing apparatus. If the median line of the amputee was correctly adjusted to coincide with the line of gravity 63 of the balancing apparatus and the weights 12 and 13, 51 and 62 were correctly adjusted the water levels 4b and 4c will be in zero position even if the balancing apparatus is not loaded by the amputee. In this case the ball 2 is fixed by means of the hand wheel 73. On the frontal leg of the horizontal frame 5 the distance is read by which the center of gravity has been shifted by changing the two-legged attitude to the one-legged attitude. On the socket 42 the planes A—B and C—D can be easily marked with the aid of the base lines A—B and C—D, the line of intersection of these planes coinciding with the line of gravity 63 and thus with the median line of the amputee.

If a bilateral amputee is to be taken care of by the balancing apparatus, the procedure is on principle the same as with a unilateral amputee. Only the former uses an artificial leg as a support on one side. If an artificial leg is not available he is provided with a provisional artificial leg made from a plaster cast or the like with a wooden support, the weight of the provisional appliance corresponding to the weight of the permanent artificial leg.

By an exact determination and fixation of the line of gravity, the frontal plane A—B, the sagittal plane C—D, the two axes of the hip joint and the position of the socket and the brim thereof as supporting elements the results of the scientific research especially the dynamic-static results of the analysis of the steps of healthy persons can be exactly applied to the manufacture of an artificial leg.

The balancing apparatus is used as a checking appliance for artificial legs, the balancing apparatus being preferably combined with an X-ray apparatus. The course of the line of gravity through the artificial leg in the one-legged attitude on the brim of the socket, the deviation of the line of gravity from the median plane, the attitude of the upper part of the trunk on the brim of the socket in general, and of the pelvis and the spine in particular, are checked. At a glance it is ascertained from the position of the base point 72 where the median line of the amputee intersects the sole of his artificial leg.

It will be understood that each of the elements described above, or two or more together, may also find a useful application in other types of balancing apparatuses differing from the types described above.

While I have illustrated and described the invention as embodied in an orthopedic balancing apparatus, I do not intend to be limited to the details shown, since various modifications and structural changes may be made without departing in any way from the spirit of my invention.

Without further analysis, the foregoing will so fully reveal the gist of my invention that others can, by applying current knowledge, readily adapt it for various applications without omitting features that fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. An orthopedic balancing apparatus for leg amputees comprising, in combination, a frame; a universal joint arranged in said frame above the levels of the centers of gravity of the amputee and of the balancing apparatus; a device for supporting a socket and the amputee, said device being suspended from said frame by said universal joint so as to be movable in three planes; and means included in said device for moving said socket and for bringing the median line of the amputee into coincidence with the line of gravity of the balancing apparatus when the amputee assumes a planned one-legged attitude on the brim of said socket.

2. An orthopedic balancing apparatus for leg amputees comprising, in combination, a frame; a universal joint arranged in said frame above the levels of the centers of gravity of the amputee and of the balancing apparatus; a device for clamping a socket and supporting the amputee; said device being suspended from said frame by said universal joint so as to be movable in three planes; and means included in said device for moving said socket and for bringing the median line of the amputee into coincidence with the line of gravity of the balancing apparatus when the amputee assumes a planned one-legged attitude on the brim of said socket.

3. An orthopedic balancing apparatus for leg amputees comprising, in combination, a frame; a universal joint arranged in said frame above the levels of the centers of gravity of the amputee and of the balancing apparatus; a device for clamping a socket and supporting the amputee, said device being suspended from said frame by said universal joint so as to be movable in three planes; said device including a vertical frame and a horizontal frame movable horizontally and vertically with respect to said vertical frame; and means included in said device for moving said socket and for bringing the median line of the amputee into coincidence with the line of gravity of the balancing apparatus when the amputee assumes a planned one-legged attitude on the brim of said socket.

4. An orthopedic balancing apparatus for leg amputees comprising, in combination, a frame; a universal joint arranged in said frame above the levels of the centers of gravity of the amputee and of the balancing apparatus; a device for clamping a socket and supporting the amputee, said device being suspended from said frame by said universal joint so as to be movable in three planes, said device including a vertical frame and brackets connecting said horizontal frame with said vertical frame so that said horizontal frame is movable horizontally and vertically with respect to said vertical frame; and means included in said device for moving said socket and for bringing the median line of the amputee into coincidence with the line of gravity of the balancing apparatus when the amputee assumes a planned one-legged attitude on the brim of said socket.

5. An orthopedic balancing apparatus for leg amputees comprising, in combination, a frame; a universal joint arranged in said frame above the levels of the centers of gravity of the amputee and of the balancing apparatus; a device having means for clamping a socket and supporting the amputee, said device being suspended from said frame by said universal joint so as to be movable in three planes, said device including a vertical frame and a horizontal frame and brackets connecting said horizontal frame with said vertical frame so that said horizontal frame is movable horizontally and vertically with respect to said vertical frame; and means included in said device for moving said socket and for bringing the median line of the amputee into coincidence with the line of gravity of the balancing apparatus when the amputee assumes a planned one-legged attitude on the brim of said socket, said moving means including a first threaded spindle rotatably arranged in said horizontal frame in a horizontal-sagittal direction and being operatively connected to said socket-clamping means so as to shift the same in horizontal-sagittal direction with respect to the line of gravity of the balancing apparatus.

6. An orthopedic balancing apparatus for leg amputees comprising, in combination, a frame; a universal joint arranged in said frame above the levels of the centers of gravity of the amputee and of the balancing apparatus; a device having means for clamping a socket and supporting the amputee, said device being suspended from said frame by said universal joint so as to be movable in three planes, said device including a vertical frame and a horizontal frame and brackets connecting said horizontal frame with said vertical frame so that said horizontal frame is movable horizontally and vertically with respect to said vertical frame; and means included in said device for moving said socket and for bringing the median line of the amputee into coincidence with the line of gravity of the balancing apparatus when the amputee assumes a planned one-legged attitude on the brim of said socket, said moving means including a first threaded spindle rotatably arranged in said horizontal frame in a horizontal-sagittal direction and being operatively connected to said socket-clamping means so as to shift the same in horizontal-sagittal direction with respect to the line of gravity of the balancing apparatus; second threaded spindles rotatably arranged in said vertical frame and respectively being connected with said brackets connecting said horizontal frame with said vertical frame so as to shift said horizontal frame upwards and downwards, manually operated means connected to said second spindles for rotating the same, and means connecting said second spindles together for rotation together.

7. An orthopedic balancing apparatus for leg amputees comprising, in combination, a frame; a universal joint arranged in said frame above the levels of the centers of gravity of the amputee and of the balancing apparatus; a device having means for clamping a socket and supporting the amputee, said device being suspended from said frame by said universal joint so as to be movable in three planes, said device including a vertical frame and a horizontal frame and brackets connecting said horizontal frame with said vertical frame so that said horizontal frame is movable horizontally and vertically with respect to said vertical frame; and means included in said device for moving said socket and for bringing the median line of the amputee into coincidence with the line of gravity of the balancing apparatus when the amputee assumes a planned one-legged attitude on the brim of said socket, said socket moving means including a first threaded spindle rotatably arranged in said horizontal frame in a horizontal-sagittal direction and being operatively connected to said socket-clamping means so as to shift the same in horizontal-sagittal direction with respect to the line of gravity of the balancing apparatus, second threaded spindles rotatably arranged in said vertical frame and respectively being connected with said brackets connecting said horizontal frame with said vertical frame so as to shift said horizontal frame upwards and downwards, manually operated means connected to said second spindles for rotating the same, means connecting said second spindles together for rotation together, third threaded spindles rotatably arranged in said horizontal frame, said third spindles extending in directions perpendicular to said horizontal-sagittal direction of said first spindle and connected with said brackets connecting said horizontal frame with said vertical frame so as to shift said horizontal frame frontally with respect to said vertical frame, and means connecting said third spindles together for rotation together so that said horizontal frame is uniformly shifted with respect to said vertical frame.

8. An orthopedic balancing apparatus for leg amputees comprising, in combination, a frame; a universal joint arranged in said frame above the levels of the centers of gravity of the amputee and of the balancing apparatus; a device having means for clamping a socket and supporting the amputee, said device being suspended from said frame by said universal joint so as to be movable in three planes, said device including a vertical frame and a horizontal frame and brackets connecting said horizontal frame with said vertical frame, so that said horizontal frame is movable horizontallya nd vertically with respect to said vertical frame, said horizontal frame having a sagittal leg and two frontal legs; and means included in said device for moving said socket and for bringing the median line of the amputee into coincidence with the line of gravity of the balancing apparatus when the amputee assumes a planned one-legged attitude on the brim of said socket, said socket moving means including a first threaded spindle rotatably arranged in said horizontal frame in a horizontal-sagittal direction and being operatively connected to said socket-clamping means so as to shift the same in horizontal-sagittal direction with respect to the line of gravity of the balancing apparatus, second threaded spindles rotatably arranged in said vertical frame and respectively being connected with said brackets connecting said horizontal frame with said vertical frame so as to shift said horizontal frame upwards and downwards, manually operated means connected to said second spindles for rotating the same, means connecting said second spindles together for rotation together, third threaded spindles rotatably arranged in said frontal legs, respectively, of said horizontal frame, said third spindles extending in directions perpendicular to said sagittal leg of said horizontal frame and connected with said brackets connecting said horizontal frame with said vertical frame so as to shift said horizontal frame frontally with respect to said vertical frame, means connecting said third spindles together for rotation together so that said horizontal frame is uniformly shifted with respect to said vertical frame, weights arranged, respectively, shiftably on said frontal legs of said horizontal frame, fourth threaded spindles arranged coaxially, respectively, with said third spindles and being connected to said weights for shifting the same on said frontal legs of said horizontal frame, and means connecting said fourth spindles together for rotation together so as to impart simultaneously shifts to said weights.

9. An orthopedic balancing apparatus for leg amputees comprising, in combination, a frame; a universal joint arranged in said frame above the levels of the centers of gravity of the amputee and of the balancing apparatus; a device having means for clamping a socket and supporting the amputee, said device being suspended from said frame by said universal joint so as to be movable in three planes, said device including a vertical frame and a horizontal frame and brackets connecting said horizontal frame with said vertical frame, so that said horizontal frame is movable horizontally and vertically with respect to said vertical frame, said vertical frame having two vertical legs and said horizontal frame having a sagittal leg and two frontal legs; and means included in said device for moving said socket and for bringing the median line of the amputee into coincidence with the line of gravity of the balancing apparatus when the amputee assumes a planned one-legged attitude on the brim of said socket, said socket moving means including a first threaded spindle rotatably arranged in said horizontal frame in a horizontal-sagittal direction and being operatively connected to said socket-clamping means so as to shift the same in horizontal-sagittal direction with respect to the line of gravity of the balancing apparatus, a pair of second threaded spindles rotatably arranged in said vertical legs of said vertical frame, respectively, and being connected with said brackets connecting said horizontal frame with said vertical frame so as to shift said horizontal frame upwards and downwards, manually operated means connected to said second spindles for rotating the same, means connecting said second spindles together for rotation together, third threaded spindles rotatably arranged in said frontal legs, respectively, of said horizontal frame, said third spindles extending in directions perpendicular to said sagittal leg of said horizontal frame and connected with said brackets connecting said horizontal frame with said vertical frame so as to shift said horizontal frame frontally with respect to said vertical frame, means connecting said third spindles together for rotation together so that said horizontal frame is uniformly shifted with respect to said vertical frame, weights arranged, respectively, shiftably on said frontal legs of said horizontal frame, fourth threaded spindles arranged coaxially, respectively, with said third spindles and being connected to said weights for shifting the same on said frontal legs of said horizontal frame, means for connecting said fourth spindles together for rotation together so as to impart simultaneously shifts to said weights, and telescoping weights arranged, respectively, on said vertical legs of said vertical frame, said telescoping weights being shiftable in directions normal to said vertical legs of said vertical frame and balancing the weight of said horizontal and vertical frames in the sagittal plane of the balancing apparatus.

10. An orthopedic balancing apparatus for leg amputees comprising, in combination, a frame; a universal joint arranged in said frame above the levels of the centers of gravity of the amputee and of the balancing apparatus; a device for clamping a socket and supporting the amputee, said device being suspended from said frame by said universal joint so as to be movable in three planes, said device including a vertical frame and a horizontal frame movable horizontally and vertically with respect to said vertical frame; three pivots mounted on said horizontal frame substantially in the plane thereof and connected to support said socket, two of said pivots being located opposite each other along one horizontal axis substantially in said plane and the third of said pivots being located laterally of said one axis and along another horizontal axis substantially in said plane, said axes being normal to each other and intersecting at one point so that the hip joint of the amputated side of the amputee can be brought to coincidence with the point of intersection of said axes of said pivots; means included in said device for moving said socket and for bringing the median line of the amputee into coincidence with the line of gravity of the balancing apparatus when the amputee assumes a planned one-legged attitude on the brim of said socket; and means connecting said socket moving means with said pivots for moving a socket clamped in said clamping device only in directions corresponding to an abduction, an adduction, a flexion and an extension, respectively.

11. An orthopedic balancing apparatus for leg amputees comprising, in combination, a frame; a universal joint arranged in said frame above the levels of the centers of gravity of the amputee and of the balancing apparatus; a device for clamping a socket and supporting the amputee, said device being suspended from said frame by said universal joint so as to be movable in three planes, said device including a vertical frame and a horizontal frame movable horizontally and vertically with respect to said vertical frame; three pivots mounted on said horizontal frame substantially in the plane thereof and connected to support said socket, two of said pivots being located opposite each other along one horizontal axis substantially in said plane and the third of said pivots being located laterally of said one axis and along another horizontal axis substantially in said plane, said axes being normal to each other extending sagitally and frontally, respectively, and intersecting at one point so that the hip joint of the amputated side of the amputee can be brought to coincidence with the point of intersection of the axes of said pivots; and a device for changing the position of said socket clamped by said clamping device and being carried by the latter, said position changing device including means for changing rotatively, frontally, sagittally and vertically the position of said socket and the hip joint of the amputated side of the amputee loading said socket relatively to the frontally directed and sagittally directed pivotal axes of said pivots and bringing the hip joint to coincidence with the point of intersection of said pivotal axes of said pivots.

12. An orthopedic balancing apparatus for leg amputees comprising, in combination, a frame; a universal joint arranged in said frame above the levels of the centers of gravity of the amputee and of the balancing apparatus; a device for clamping a socket and supporting the amputee, said device being suspended from said frame by said universal joint so as to be movable in three planes, said device including a vertical frame and a horizontal frame movable horizontally and vertically with respect to said vertical frame; three pivots mounted on said horizontal frame substantially in the plane thereof and connected to support said socket, two of said pivots being located opposite each other along one horizontal axis substantially in said plane and the third of said pivots being located laterally of said one axis and along another horizontal axis substantially in said plane, said axes being normal to each other and intersecting at one point so that the hip joint of the amputated side of the amputee can be brought to coincidence with the point of intersection of the said axes of said pivots, said pivots each being formed with an axial bore; pins having pointed ends and being arranged, respectively, in said bores; means included in said device for moving said socket and for bringing the median line of the amputee into coincidence with the line of gravity of the balancing apparatus when the amputee assumes a planned one-legged attitude on the brim of said socket; and means connecting said socket moving means with said pivots for moving a socket clamped in said clamping device only in directions corresponding to an abduction, an adduction, a flexion and an extension, respectively.

13. An orthopedic balancing arrangement for leg amputees comprising, in combination, a frame; a universal joint arranged in said frame above the levels of the centers of gravity of the amputee and of the balancing apparatus; a device having means for clamping a socket and supporting the amputee, said device being suspended from said frame by said universal joint so as to be movable in three planes, and said device including a vertical frame, a horizontal frame and brackets connecting said horizontal frame with said vertical frame so that said horizontal frame is movable horizontally and vertically with respect to said vertical frame; means included in said device for moving said socket and for bringing the median line of the amputee into coincidence with the line of gravity of the balancing apparatus when the amputee assumes a planned one-legged attitude on the brim of said socket; a first threaded spindle forming part of said socket moving means and rotatably arranged in said horizontal frame in a horizontal-sagittal direction; a bridge arranged on said horizontal frame and being slidable in sagittal direction by means of said first spindle, said bridge supporting said socket-clamping means and being moved by rotation of said first threaded spindle so as to shift said socket-clamping means in horizontal-sagittal direction with respect to the line of gravity of the balancing apparatus; three pivots mounted on said bridge substantially in the plane of said horizontal frame and connected to support said socket-clamping means, two of said pivots being located opposite each other along one horizontal axis substantially in said plane and the third of said pivots being located laterally of said one axis and along another horizontal axis substantially in said plane, said axes being normal to each other and intersecting at one point; means turnably arranged on said third pivot and connected to said bridge; and means for fixing the position of said turnable means with respect to said bridge, the other two pivots being mounted on said turnably arranged means.

ERICH FEINE.

References Cited in the file of this patent

FOREIGN PATENTS

| Number | Country | Date |
| --- | --- | --- |
| 889,070 | France | Sept. 20, 1943 |